US012620808B2

(12) United States Patent
Kumar et al.

(10) Patent No.: US 12,620,808 B2
(45) Date of Patent: May 5, 2026

(54) POWER TRANSMISSION NETWORKS

(71) Applicant: GE Infrastructure Technology LLC, Greenville, SC (US)

(72) Inventors: Amit Kumar, Stafford (GB); Andrzej Adamczyk, Stafford (GB)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 18/880,065

(22) PCT Filed: Jul. 19, 2023

(86) PCT No.: PCT/EP2023/070062
§ 371 (c)(1),
(2) Date: Dec. 30, 2024

(87) PCT Pub. No.: WO2024/017962
PCT Pub. Date: Jan. 25, 2024

(65) Prior Publication Data
US 2025/0350122 A1      Nov. 13, 2025

(30) Foreign Application Priority Data

Jul. 20, 2022    (EP) ..................................... 22275099

(51) Int. Cl.
*H02J 3/36*          (2026.01)
*H02J 3/38*          (2026.01)
*H02J 101/28*        (2026.01)
(52) U.S. Cl.
CPC .................. *H02J 3/36* (2013.01); *H02J 3/38* (2013.01); *H02J 2101/28* (2026.01)

(58) Field of Classification Search
CPC ........ H02J 3/36; H02J 3/38; H02J 3/00; H02J 1/00; H02J 3/16; H02J 3/381; H02J 2101/28; H02H 3/16; Y02E 60/60
(Continued)

(56)                References Cited

U.S. PATENT DOCUMENTS 8,559,197 B2 * 10/2013 Cullinane ................. H02P 9/02
                                                        363/39
12,218,504 B2 * 2/2025 Kumar ...................... H02J 3/48
(Continued)

FOREIGN PATENT DOCUMENTS

EP            3329506 A1      6/2018
WO        2016026524 A1      2/2016

OTHER PUBLICATIONS

Extended European Search Report issued in EP Application No. 22275099.4 dated Feb. 16, 2023, 7 pages.
(Continued)

*Primary Examiner* — Daniel Cavallari
*Assistant Examiner* — Swarna N Chowdhuri
(74) *Attorney, Agent, or Firm* — Eversheds Sutherland (US) LLP

(57)                ABSTRACT

A multi-terminal power transmission network includes first and second DC terminals that are interconnected by a first transmission conduit to permit the transfer of power. The first DC terminal is connected with an interconnection conduit and is separately connected with a first power converter. The first power converter interconnects the first DC terminal with a first AC network element and includes a first converter controller. The second DC terminal is interconnected with a second AC network element by a second power converter which includes a second converter controller. The first power converter further includes a supplementary controller to selectively modify the first DC (Continued)

voltage reference that the first power converter is required to provide so as to drive the DC current flowing in the interconnection conduit below a predetermined threshold and facilitate disconnection of the interconnection conduit from the first DC terminal via opening of the first interconnector switch.

9 Claims, 4 Drawing Sheets

(58) Field of Classification Search
USPC ........................................ 307/11, 82; 363/35
See application file for complete search history.

(56) References Cited

U.S. PATENT DOCUMENTS

2018/0145499 A1*   5/2018   Gupta .................... H02H 7/268
2018/0175622 A1*   6/2018   Brorsson ................... H02J 3/36

OTHER PUBLICATIONS

International Search Report and Written Opinion for PCT/EP2023/070062, dated Oct. 26, 2023, 13 pages.

* cited by examiner

POWER TRANSMISSION NETWORKS

TECHNICAL FIELD

This invention relates to a multiple-terminal power transmission network and to a method of operating such a network.

BACKGROUND OF THE INVENTION

In high voltage direct current (HVDC) power transmission networks AC power is typically converted to DC power for transmission via overhead lines, under-sea cables and/or underground cables. This conversion removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance.

The conversion between DC power and AC power is utilised where it is necessary to interconnect DC and AC networks. In any such power transmission network, converters (i.e. power converters) are required at each interface between AC and DC power to effect the required conversion from AC to DC or from DC to AC.

SUMMARY OF THE INVENTION

According to a first aspect of the invention there is provided a multi-terminal power transmission network comprising at least first and second DC terminals interconnected by a first transmission conduit to permit the transfer of power between the first and second DC terminals, the first DC terminal additionally being connected via a first interconnector switch with an interconnection conduit extending in-use to a further DC terminal and separately connected with a first power converter, the first power converter interconnecting the first DC terminal with a first AC network element and including a first converter controller programmed to control the transfer of power between the first AC network element and the first transmission and interconnection conduits by establishing at least a first DC voltage reference that the first power converter is required to provide, and the second DC terminal additionally being interconnected with a second AC network element by a second power converter including a second converter controller programmed to control the transfer of power between the first transmission conduit and the second AC network element, the first power converter further including a first supplementary controller programmed to selectively modify, as a function of the DC current flowing in the interconnection conduit, the first DC voltage reference that the first power converter is required to provide so as to drive the said DC current flowing in the interconnection conduit below a predetermined threshold and thereby facilitate disconnection of the interconnection conduit from the first DC terminal via opening of the first interconnector switch.

Such a first supplementary controller directly influences the first power converter based on only local information, i.e. the DC current flowing in the interconnection conduit, and so can achieve high fidelity control of the DC current flowing in the interconnection conduit.

As a consequence, the first supplementary controller is advantageously able to very reliably ensure that such a DC current does not exceed the predetermined threshold throughout the process of opening the first interconnector switch, and therefore desirably allows the use of regular interconnector switches without any significant (and therefore costly) current interruption capability.

Additionally, the ultimate opening of the first interconnector switch to disconnect the interconnection conduit from the first DC terminal is able to take place without having to reduce or, worse still stop, the exchange of power between the first AC network element, first transmission conduit, and second AC network element.

Moreover, having a first supplementary controller which only needs to modify the first DC voltage reference avoids the need to change the AC current reference of the first power converter, a step that may not always be possible, e.g. if the first power converter is operating in a voltage-frequency control mode, or desirable if the DC current output of the first power converter is to be maintained. Thus, the multi-terminal power transmission network of the invention is able to accommodate a wide range of differing power converter types and associated control methodologies, as well a differing connection topologies.

Preferably the second converter controller is programmed to selectively operate the second power converter in a DC voltage control mode whereby, in response to a change in the DC voltage reference the first power converter is required to provide and the resulting change in voltage across the first transmission conduit, the second converter controller modifies the DC current reference the second power converter is required to provide in order that the second power converter achieves a DC voltage reference that accommodates the change in voltage across the first transmission conduit.

Modifying the DC current reference which the second power converter is required to provide beneficially shifts the DC current flowing through the interconnection conduit to the second power converter and thus additionally helps to drive the said DC current flowing in the interconnection conduit below the predetermined threshold.

The first supplementary controller may be programmed to selectively modify the first DC voltage reference as a function of the DC current flowing in the interconnection conduit by:

measuring the DC current flowing in the interconnection conduit;

comparing the measured DC current with the predetermined threshold;

determining a DC voltage offset which is a function of any difference between the measured DC current and the predetermined threshold; and applying the DC voltage offset to the DC voltage reference established by the first converter controller to create a modified DC voltage reference that the first power converter is then required to provide.

Such a first supplementary controller relies only on highly accurate, local, DC current measurements, e.g. via a narrow band current transformer, and so helps to ensure the required degree of high fidelity control of the DC current flowing in the interconnection conduit, and thus safe opening of the first interconnector switch.

Optionally the first supplementary controller is programmed to selectively modify the first DC voltage reference as a function of the DC current flowing in the interconnection conduit within either of an open or closed control loop.

Flexibility in how the first supplementary controller is programmed to selectively modify the first DC voltage reference renders the multi-terminal power transmission network of the invention adaptable for use in a wide range of control scenarios.

In a preferred embodiment of the invention the predetermined threshold for the DC current flowing through the interconnection conduit is the first interconnector switch current breaking capability.

Setting the predetermined threshold for the DC current flowing through the interconnection conduit in the aforementioned manner desirably helps to ensure that the first interconnector switch is always able to operate when needed.

Preferably the first power converter is or includes an offshore power converter and the first AC network element is or includes an offshore wind farm.

The second power converter may be or include a land-based power converter and the second AC network element is or includes an AC supply grid.

The aforementioned configurations advantageously apply the invention to real-world applications, especially those in which power converters, e.g. offshore power converters, in which AC current control is not possible or desirable.

Another preferred embodiment of the invention further includes third and fourth DC terminals interconnected by a second transmission conduit to permit the transfer of power between the third and fourth DC terminals, the third DC terminal additionally being connected via a second interconnector switch with the interconnection conduit, and separately connected with a third power converter, the third power converter interconnecting the third DC terminal with a third AC network element and including a third converter controller programmed to control the transfer of power between the third AC network element and the second transmission and interconnection conduits by establishing at least a third DC voltage reference that the third power converter is required to provide, and the fourth DC terminal additionally being interconnected with a fourth AC network element by a fourth power converter including a fourth converter controller programmed to control the transfer of power between the second transmission conduit and the fourth AC network element, the third power converter further including a second supplementary controller programmed to selectively modify the third DC voltage reference that the third power converter is required to provide in cooperation with any changes in the DC current flowing in the interconnection conduit initiated by the first supplementary controller and thereby facilitate disconnection of the interconnection conduit from the third DC terminal via opening of the second interconnector switch.

Such a multi-terminal power transmission network shares the benefits associated with operation of the first supplementary controller mentioned hereinabove, i.e. achieving high fidelity control of the DC current flowing in the interconnection conduit and consequently the ability to use regular interconnector switches to disconnect the interconnection conduit from both the first and third DC terminals and thereby temporarily switch to a pair of point-to-point networks, i.e. a first point-to-point network in which the first and second DC terminals and first transmission conduit interconnecting them operate as a first independent link with its own first and second power converters, and a second point-to-point network in which the third and fourth DC terminals and second transmission conduit interconnecting them operate as a second independent link with its own third and fourth power converters.

Such complete disconnection of the interconnection conduit from both of the first and second transmission conduits, advantageously, can similarly take place without having to alter the exchange of power between the first AC network element and the third AC network element.

Additionally it avoids the need to change the AC current reference of the third power converter, a step that may not always be possible, e.g. if the third power converter is located offshore.

Moreover, each of the first and second supplementary controllers require only local information, i.e. the level of DC current flowing in the interconnection conduit which is available at either end thereof, and so coordinating the DC voltage at which each of the first and second transmission conduits operates does not require a healthy telecommunication link between the various power converters and their associated converter controllers.

Preferably the fourth converter controller is programmed to selectively operate the fourth power converter in a DC voltage control mode whereby, in response to a change in the DC voltage reference the third power converter is required to provide and the resulting change in voltage across the second transmission conduit, the fourth converter controller modifies the DC current reference the fourth power converter is required to provide in order that the fourth power converter achieves a DC voltage reference that accommodates the change in voltage across the second transmission conduit.

Modifying the DC current reference which the fourth power converter is required to provide beneficially shifts the DC current flowing through the interconnection conduit to the second transmission conduit and fourth power converter connected therewith, and thus additionally helps to accommodate driving down of the DC current flowing in the interconnection conduit below the predetermined threshold.

According to a second embodiment of the invention there is provided a method of operating a multi-terminal power transmission network comprising at least first and second DC terminals interconnected by a first transmission conduit to permit the transfer of power between the first and second DC terminals, the first DC terminal additionally being connected via a first interconnector switch with an interconnection conduit extending in-use to a further DC terminal and separately connected with a first power converter, the first power converter interconnecting the first DC terminal with a first AC network element and including a first converter controller programmed to control the transfer of power between the first AC network element and the first transmission and interconnection conduits by establishing at least a first DC voltage reference that the first power converter is required to provide, and the second DC terminal additionally being interconnected with a second AC network element by a second power converter including a second converter controller programmed to control the transfer of power between the first transmission conduit and the second AC network element, the first power converter further including a first supplementary controller and the method of the invention comprising the step of having the first supplementary controller selectively modify, as a function of the DC current flowing in the interconnection conduit, the first DC voltage reference that the first power converter is required to provide so as to drive the said DC current flowing in the interconnection conduit below a predetermined threshold and thereby facilitate disconnection of the interconnection conduit from the first DC terminal via opening of the first interconnector switch.

The method of the invention shares the benefits of the corresponding features of the apparatus of the invention.

It will be appreciated that the use of the terms "first" and "second", and the like, in this patent specification is merely intended to help distinguish between similar features (e.g. the first and second DC terminals, and the first and second power converters), and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

There now follows a brief description of preferred embodiments of the invention, by way of non-limiting example, with reference being made to the following figures in which:

FIG. 3(*b*) shows changes to DC currents and DC voltages in a second power converter during the aforesaid switching of the power transmission network shown in FIG. 1 from a multi-terminal configuration to a point-to-point configuration.

DETAILED DESCRIPTION

Figure 1:
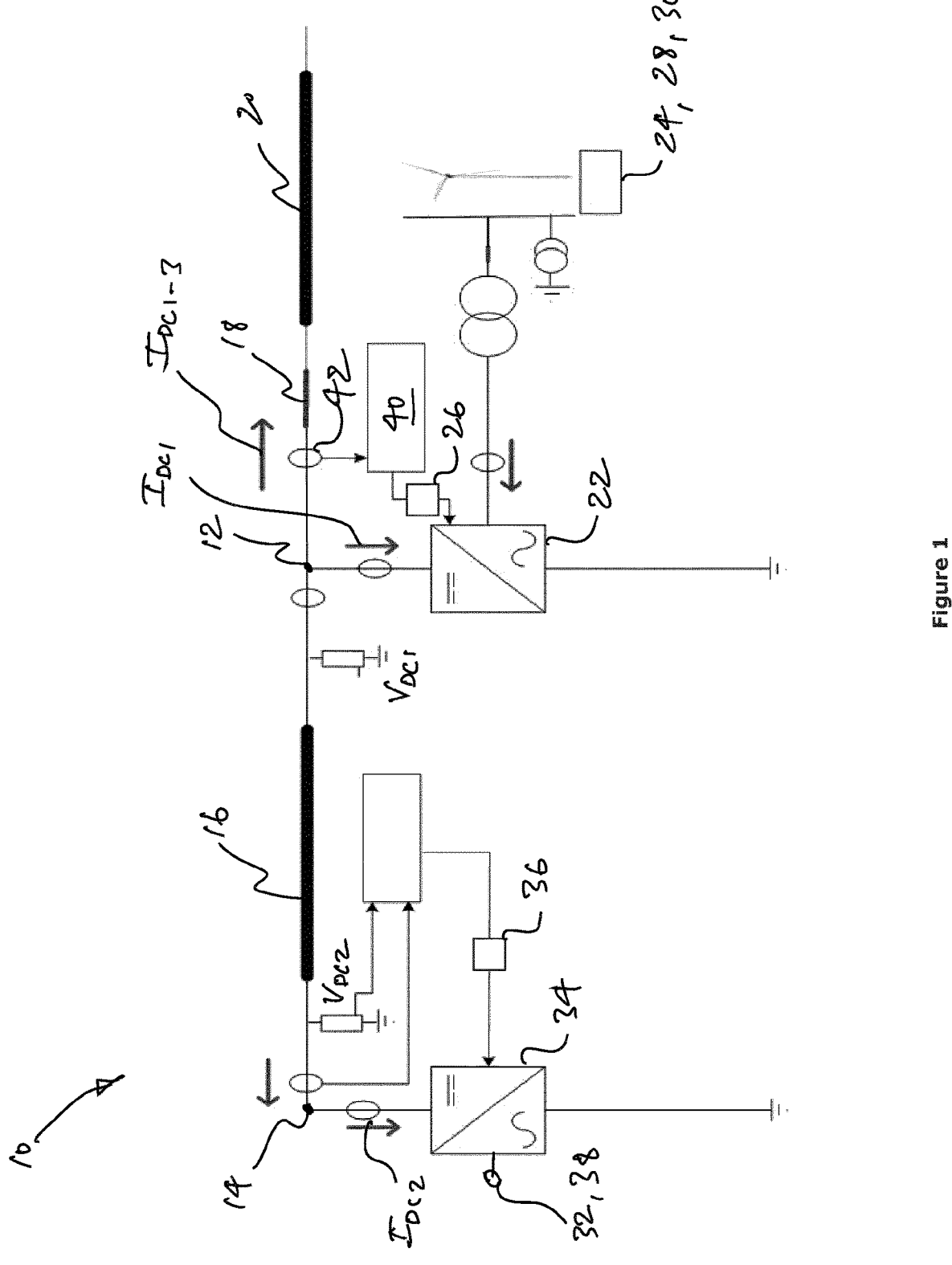
FIG. 1 shows a schematic view of a multi-terminal power transmission network according to a first embodiment of the invention.

A multi-terminal power transmission network according to a first embodiment of the invention is designated generally by reference numeral 10, as shown in FIG. 1.

The first multi-terminal power transmission network 10 includes first and second DC terminals 12, 14 that are interconnected by a first transmission conduit 16 which permits the transfer of power between the first and second DC terminals 12, 14.

In the embodiment shown the first transmission conduit 16 is or includes a subsea cable, although in other embodiments of the invention it might be, or include, an overhead line, an underground cable, or a mixture of such cables and line. In other embodiments (not shown) the first transmission conduit may include multiple cables or lines which define a bipole or symmetrical monopole arrangement.

As well as being connected with the first transmission conduit 16, the first DC terminal 12 is also connected, via a first interconnector switch 18, with an interconnection conduit 20 which extends, in-use, to a further DC terminal (not shown). The first interconnector switch 18 is a regular DC disconnector switch, i.e. one without any significant DC current interruption capability. Meanwhile the interconnection conduit 20 is similarly a subsea cable although, again this may not necessarily be the case and it could be or include some other form of cable or line, or indeed multiple cables or lines.

The first DC terminal 12 is separately connected, i.e. not via the first interconnector switch 18, with a first power converter 22 which interconnects the first DC terminal 12 with a first AC network element 24. Additionally, the first power converter 22 includes a first converter controller 26 that is programmed to control the transfer of power, between the first AC network element 24 and each of the first transmission conduit 16 and the interconnection conduit 20, by establishing a first DC voltage reference $V_{DC1}$ that the first power converter 22 is required to provide.

The first power converter 22 shown is a voltage source converter, although other types of power converter can be used.

The voltage source converter shown has a known configuration which includes three converter limbs that correspond to three phases of the first AC network element 24, although in other embodiments this need not necessarily be the case. More particularly, in the illustrated embodiment, the first power converter 22 is located offshore and the first AC network element 24 is a first AC power source 28 in the form of a first wind farm 30, although again this need not necessarily be the case in other embodiments of the invention and the first power converter may be located on land and the first AC network element could be some other form of AC power source or a consumer of AC power.

Each converter limb includes first and second limb portions which are separated by a corresponding AC terminal (not shown), and each limb portion has a chain-link converter that includes a plurality of series connected chain-link modules.

Each chain-link module includes a number of switching elements which are connected in parallel with an energy storage device in the form of a capacitor (although other types of energy storage device, i.e. any device that is capable of storing and releasing energy to selectively provide a voltage, e.g. a fuel cell or battery, may also be used however).

The provision of a plurality of chain-link modules means that it is possible to build up a combined voltage across each chain-link converter, via the insertion of the energy storage devices, i.e. the capacitors, of multiple chain-link modules (with each chain-link module providing its own voltage), which is higher than the voltage available from each individual chain-link module.

Accordingly, each of the chain-link modules work together to permit the chain-link converter to provide a stepped variable voltage source. This permits the generation of a voltage waveform across each chain-link converter using a step-wise approximation. As such each chain-link converter is capable of providing a wide range of complex waveforms.

For example, operation of each chain-link converter in the foregoing manner can be used to additionally generate an AC voltage waveform at each AC terminal, whereby the first power converter 22 is able to provide the aforementioned power transfer functionality, i.e. the transfer of power between the first AC network element 24, i.e. the first wind farm 30, and each of the first transmission conduit 16 and the interconnection conduit 20.

Meanwhile, the second DC terminal 14 is additionally interconnected with a second AC network 32 element by a second power converter 34 that has a second converter controller 36 that is programmed to control the transfer of power between the first transmission conduit 16 and the second AC network element 32.

More particularly, the second power converter 34 is also a voltage source converter of the type described above, although again other types of power converter can be used.

The second AC network element 32 is a first AC supply grid 38 to which AC power is provided by the second power converter 34, although in other embodiments the second AC network element may instead provide AC power to the second power converter rather than receive AC power from it.

In addition to the foregoing, the first power converter 22 further includes a first supplementary controller 40 that is programmed to selectively modify, as a function of the DC current $I_{DC1-3}$ flowing in the interconnection conduit 20, the first DC voltage reference $V_{DC1}$ that the first power converter 22 is required to provide. The first supplementary controller 40 is programmed to do this so as to drive the DC current $I_{DC1-3}$ flowing in the interconnection conduit 20 below a predetermined threshold $I_{REF}$, and thereby facilitate disconnection of the interconnection conduit 20 from the first DC terminal 12 via opening of the first interconnector switch 18.

In the embodiment shown the predetermined threshold $I_{REF}$ is the current breaking capability of the first interconnector switch 18, which typically is close to zero or only a few amperes. The predetermined threshold $I_{REF}$ may, however, be any specific value according to the desired operating characteristics of the multi-terminal power transformer network.

The first supplementary controller 40 is shown in the illustrated embodiment in FIG. 1 as being separate from the first converter controller 26, although in other embodiments the first supplementary controller may be a part of the first converter controller or its functionality implemented by the first converter controller.

Returning to the embodiments shown, the first supplementary controller 40 is programmed to selectively modify, e.g. in response to an instruction to disconnect the interconnection conduit 20 from the first DC terminal 12, the first DC voltage reference $V_{DC1}$ as a function of the DC current $I_{DC1-3}$ flowing in the interconnection conduit, to cause such a reduction in that DC current $I_{DC1-3}$ flow, as follows.

Firstly the first supplementary controller 40 measures the actual DC current $I_{DC1-3}$ flowing in the interconnection conduit 20, which can be done very accurately using, for example, a narrow band current transformer 42, although other measuring devices can also be used.

The first supplementary controller 40 then compares the measured DC current $I_{DC1-3}$ with the predetermined threshold $I_{REF}$, which for example may be zero amps.

Figure 2:
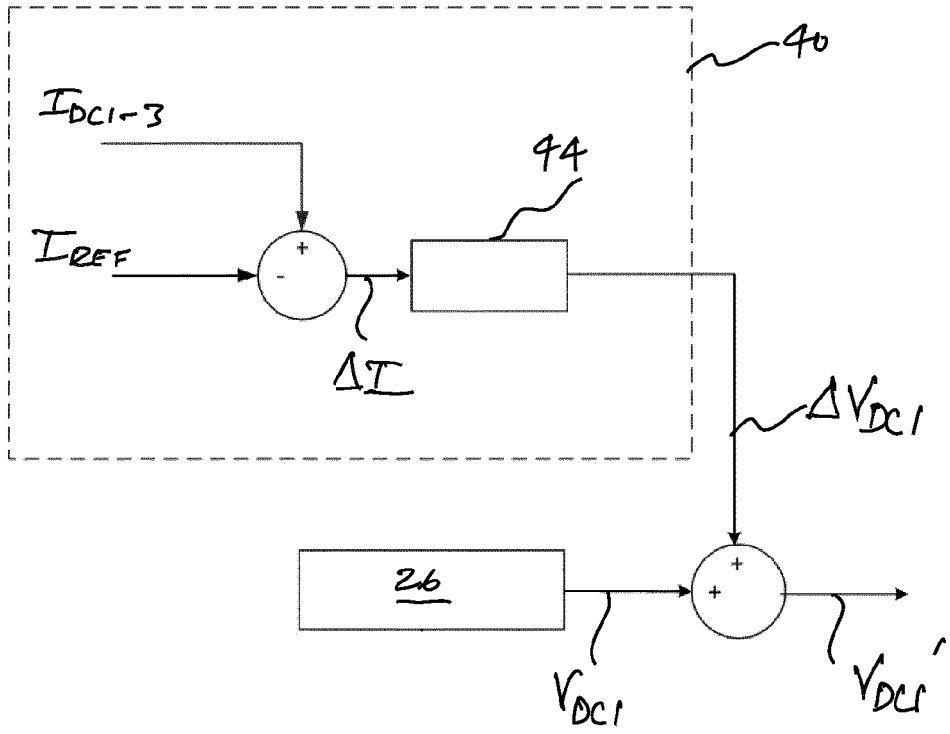
FIG. 2 illustrates schematically one way in which a first supplementary controller forming a part of the multi-terminal power transmission network shown in FIG. 1 may be programmed.

Then the first supplementary controller 40 determines a DC voltage offset $\Delta V_{DC1}$ which, preferably, is proportional to the difference $\Delta I$ between the measured DC current $I_{DC1-3}$ and the predetermined threshold $I_{REF}$, but may be any function of the difference $\Delta I$ between the measured DC current $I_{DC1-3}$ and the predetermined threshold $I_{REF}$. Such a DC voltage offset $\Delta V_{DC1}$ may be determined by applying a proportional integral 44 to the difference $\Delta I$, e.g. as shown schematically in FIG. 2.

Finally the first supplementary controller 40 applies the DC voltage offset $\Delta V_{DC1}$ to the DC voltage reference $V_{DC1}$ established by the first converter controller 26 to create a modified DC voltage reference $V_{DC1}'$ that the first power converter 22 is then required to provide instead.

In this manner the first supplementary controller 40 is programmed to selectively modify the first DC voltage reference $V_{DC1}$ as a function of the DC current $I_{DC1-3}$ flowing in the interconnection conduit 20 within a closed control loop, although in other embodiments it could do so within an open control loop.

In addition to the foregoing, the second converter controller 36 is programmed to selectively operate, e.g. in response to the same instruction to disconnect the interconnection conduit 20 from the first DC terminal 12 received by the first supplementary controller 40, the second power converter 34 in a DC voltage control mode.

When operating the second power converter 34 in such a DC voltage control mode, the second converter controller 36 modifies, in response to a change in the DC voltage reference $V_{DC1}$ the first power converter 22 is required to provide, i.e. in response to the modified DC voltage reference $V_{DC1}'$ created by the first supplementary controller 40 and the resulting change in voltage across the first transmission conduit 16, the second converter controller 36 modifies the DC current reference $I_{DC2}$ the second power converter 34 is required to provide in order that the second power converter 34 achieves a DC voltage reference $V_{DC2}$ that accommodates the change in voltage across the first transmission conduit 16.

Accordingly, in use, the first multi-terminal power transmission network 10 can be operated as follows.

In normal use the interconnection conduit 20 remains connected to the first DC terminal 12 and power can flow from the first AC network element 24, i.e. the first wind farm 30, via the first power converter 22 into both the interconnection conduit 20 and the first transmission conduit 16, and from the first transmission conduit 16 into the second AC network element 32, i.e. the first AC supply grid 38, via the second power converter 34.

Figures 3A, 3B:
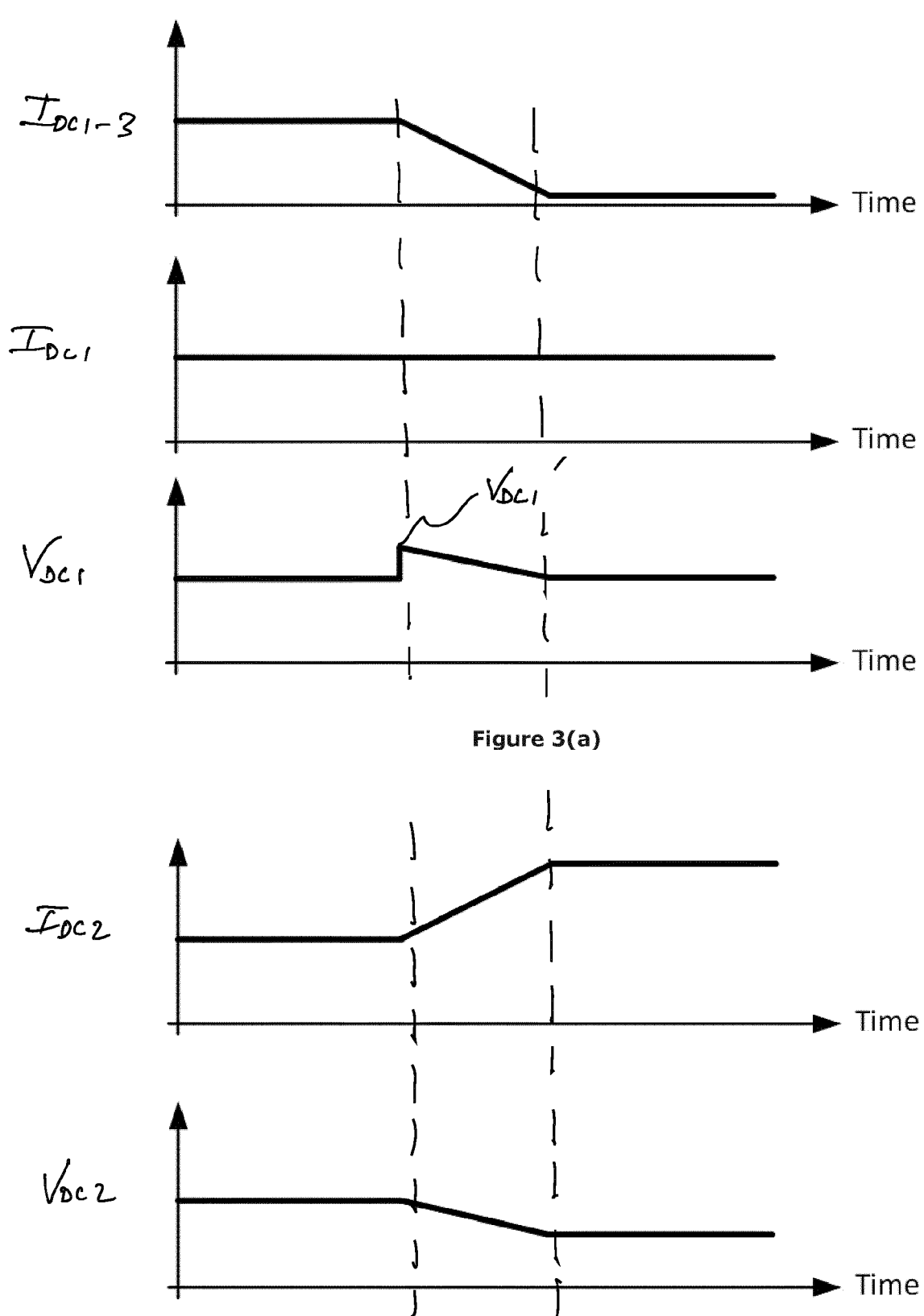
FIG. 3(*a*) shows changes to DC currents and DC voltages in a first power converter during switching of the power transmission network shown in FIG. 1 from a multi-terminal configuration to a point-to-point configuration.

When it is desired to disconnect the interconnection conduit 20 from the first DC terminal 12, i.e. by opening the first interconnector switch 18, the first supplementary controller 40 drives the DC current $I_{DC1-3}$ flowing in the interconnection conduit 20 towards zero by increasing the DC voltage reference $V_{DC1}$ the first power converter 22 is required to provide, i.e. by creating an increased DC voltage reference $V_{DC1}'$ that the first power converter 22 is instead required to provide, e.g. as shown in FIG. 3(a).

As also shown in FIG. 3(a), such driving down of the DC current $I_{DC1-3}$ flowing in the interconnection conduit 20 is achieved without having to change the DC current reference $I_{DC1}$ the first power converter 22 is required to provide, which in may not be possible in some circumstances, e.g. particular if the first power converter 22 is (as is the case in the first embodiment shown) located offshore.

Meanwhile, as illustrated in FIG. 3(b), the second converter controller 36 reacts to the increased DC voltage reference $V_{DC1}'$ that the first power converter 22 is instead required to provide by increasing the DC current reference $I_{DC2}$ the second power converter 34 is required to provide. This, in turn, results in the second power converter 34 adopting a lower DC voltage reference $V_{DC2}$ that accommodates the change in voltage across the first transmission conduit 16.

Thereafter the first interconnector switch 18 can be opened and the interconnection conduit 20 disconnected from the first DC terminal 12. The remaining power transmission network comprising the first and second DC terminals 12, 14 connected with one another by the first transmission conduit 16, along with the associated first and second power converters 22, 34 and accompanying first wind farm 30 and first AC supply grid 38, then has a point-to-point configuration.

Figure 4:
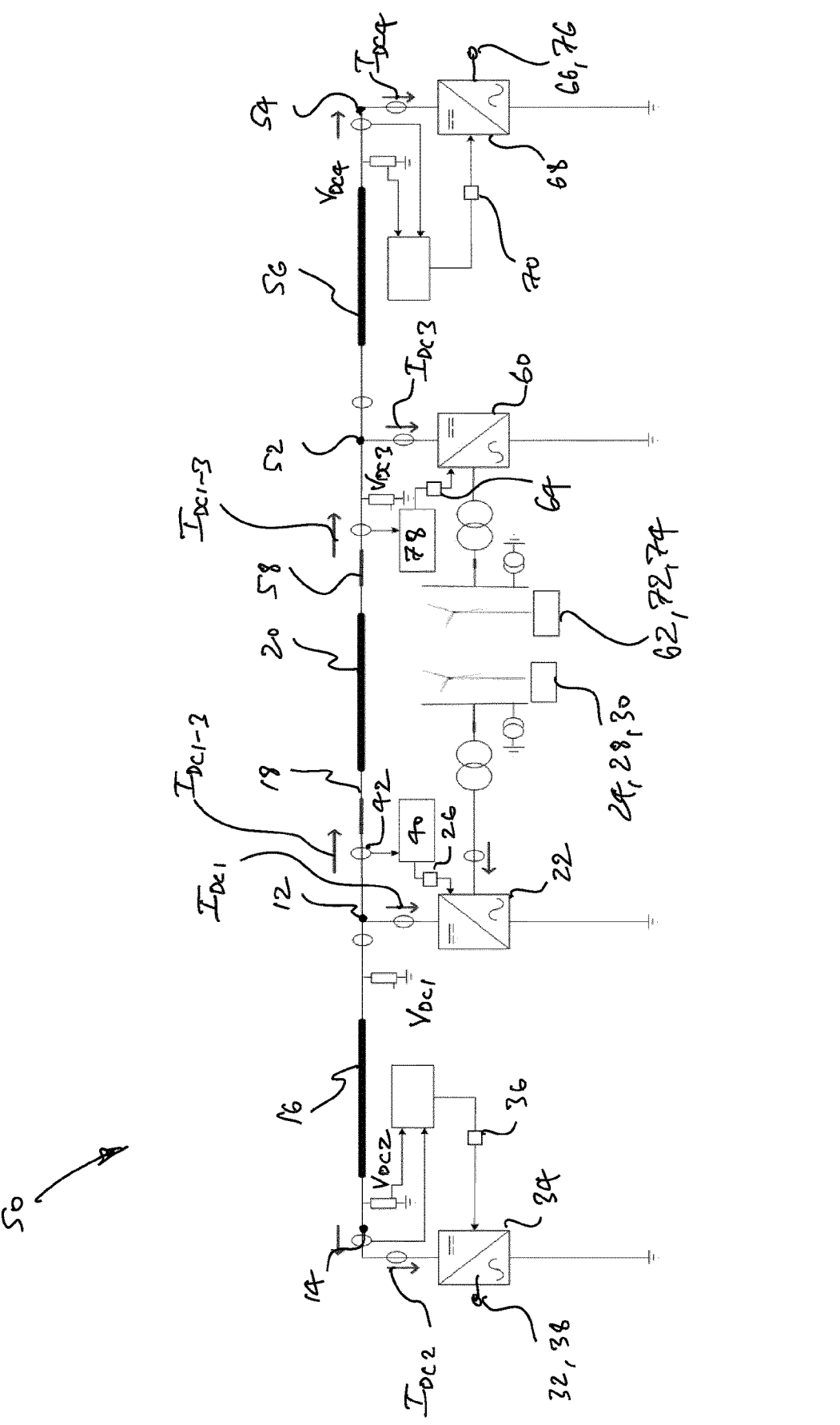
FIG. 4 shows a schematic view of a multi-terminal power transmission network according to a second embodiment of the invention.

A multi-terminal power transmission network according to a second embodiment of the invention is designated generally by reference numeral 50, as shown in FIG. 4.

The second multi-terminal power transmission network 50 includes all of the features of the first multi-terminal power transmission network 10, with those common features sharing the same reference numerals in FIG. 4.

The second multi-terminal power transmission network 50 does, however, additionally include third and fourth DC terminals 52, 54 that are interconnected by a second transmission conduit 56 which permits the transfer of power between the third and fourth DC terminals 52, 54.

The third DC terminal 52 is additionally connected, via a second interconnector switch 58, with the interconnection conduit 18 (which is otherwise identical to that described in connection with the first multi-terminal power transmission network 10).

The third DC terminal 52 is also separately connected, i.e. not connected via the second interconnector switch 58, with a third power converter 60 which interconnects the third DC terminal 52 with a third AC network element 62.

The third power converter 60 includes a third converter controller 64 which is programmed to control the transfer of power between the third AC network element 62 and each of the second transmission conduit 56 and the interconnection conduit 20, the third converter controller 64 achieving such control by establishing a third DC voltage reference $V_{DC3}$ that the third power converter 60 is required to provide.

Meanwhile, the fourth DC terminal 54 is additionally interconnected with a fourth AC network 66 element by a fourth power converter 68 that includes a fourth converter controller 70 which is programmed to control the transfer of power between the second transmission conduit 56 and the fourth AC network element 66.

In the embodiment shown the third power converter 60 takes the form of a voltage source converter that is located offshore and the third AC network element 62 is a second AC power source 72 which takes the form of a second wind farm 74, while the fourth power converter 68 similarly takes the form of a voltage source converter, but is instead located on land, and the fourth AC network element 66 takes the form of a second AC supply grid 76. The types, form and location of any of the foregoing may differ in other embodiments of the invention, however.

Additionally, the third power converter 60 also includes a second supplementary controller 78 that is programmed in a similar manner to the first supplementary controller 40.

More particularly, the second supplementary controller 78 is programmed to selectively modify the third DC voltage reference $V_{DC3}$ that the third power converter 60 is required to provide in cooperation with any changes in the DC current $I_{DC1-3}$ flowing in the interconnection conduit 20 initiated by the first supplementary controller 40 and thereby similarly facilitate disconnection of the interconnection conduit 20 from the third DC terminal 52 via opening of the second interconnector switch 58.

More particularly still, the second supplementary controller 78 selectively modifies the third DC voltage reference $V_{DC3}$ that the third power converter 60 is required to provide in cooperation with operation of the first supplementary controller 40 to drive the DC current $I_{DC1-3}$ flowing in the interconnection conduit 20 below the predetermined threshold $I_{REF}$.

In the meantime, the fourth converter controller 70 is programmed to selectively operate the fourth power converter 68 in a DC voltage control mode whereby, in response to a change in the DC voltage reference $V_{DC3}$ the third power converter 60 is required to provide and the resulting change in voltage across the second transmission conduit 56, the fourth converter controller 70 modifies the DC current reference $I_{DC4}$ the fourth power converter 68 is required to provide in order that fourth power converter 68 achieves a DC voltage reference $V_{DC4}$ that accommodates the change in voltage across the second transmission conduit 56.

We claim:

1. A multi-terminal power transmission network comprising: at least first and second DC terminals interconnected by a first transmission conduit to permit the transfer of power between the first and second DC terminals, the first DC terminal additionally being connected via a first interconnector switch with an interconnection conduit extending in-use to a further DC terminal and separately connected with a first power converter, the first power converter interconnecting the first DC terminal with a first AC network element and including a first converter controller programmed to control the transfer of power between the first AC network element and the first transmission and interconnection conduits by establishing at least a first DC voltage reference that the first power converter is required to provide, and the second DC terminal additionally being interconnected with a second AC network element by a second power converter including a second converter controller programmed to control the transfer of power between the first transmission conduit and the second AC network element, the first power converter further including a first supplementary controller programmed to selectively modify, as a function of a DC current flowing in the interconnection conduit, the first DC voltage reference that the first power converter is required to provide so as to drive the DC current flowing in the interconnection conduit below a predetermined threshold and thereby facilitate disconnection of the interconnection conduit from the first DC terminal via opening of the first interconnector switch;

further including third and fourth DC terminals interconnected by a second transmission conduit to permit the transfer of power between the third and fourth DC terminals; the third DC terminal additionally being connected via a second interconnector switch with the interconnection conduit, and separately connected with a third power converter, the third power converter interconnecting the third DC terminal with a third AC network element and including a third converter controller programmed to control the transfer of power between the third AC network element and the second transmission and interconnection conduits by establishing at least a third DC voltage reference that the third power converter is required to provide; and the fourth DC terminal additionally being interconnected with a fourth AC network element by a fourth power converter including a fourth converter controller programmed to control the transfer of power between the second transmission conduit and the fourth AC network element, the third power converter further including a second supplementary controller programmed to selectively modify the third DC voltage reference that the third power converter is required to provide in cooperation with any changes in the DC current flowing in the interconnection conduit initiated by the first supplementary controller and thereby facilitate disconnection of the interconnection conduit from the third DC terminal via opening of the second interconnector switch.

2. A multi-terminal power transmission network according to claim 1, wherein the second converter controller is programmed to selectively operate the second power converter in a DC voltage control mode whereby, in response to a change in the first DC voltage reference the first power converter is required to provide and the resulting change in voltage across the first transmission conduit, the second converter controller modifies a DC current reference the second power converter is required to provide in order that the second power converter achieves a DC voltage reference that accommodates the change in voltage across the first transmission conduit.

3. A multi-terminal power transmission network according to claim 1, wherein the first supplementary controller is programmed to selectively modify the first DC voltage reference as a function of the DC current flowing in the interconnection conduit by: measuring the DC current flowing in the interconnection conduit; comparing a measured DC current with the predetermined threshold; determining a DC voltage offset which is a function of any difference between the measured DC current and the predetermined threshold; and applying the DC voltage offset to the first DC voltage reference established by the first converter controller to create a modified DC voltage reference that the first power converter is then required to provide.

4. A multi-terminal power transmission network according to claim 1, wherein the first supplementary controller is programmed to selectively modify the first DC voltage reference as a function of the DC current flowing in the interconnection conduit within either of an open or closed control loop.

5. A multi-terminal power transmission network according to claim 1, wherein the predetermined threshold for the DC current flowing through the interconnection conduit is the first interconnector switch current breaking capability.

6. A multi-terminal power transmission network according to claim 1, wherein the first power converter is or includes an offshore power converter and the first AC network element is or includes an offshore wind farm.

7. A multi-terminal power transmission network according to claim 1, wherein the second power converter is or includes a land-based power converter and the second AC network element is or includes an AC supply grid.

8. A multi-terminal power transmission network according to claim 1, wherein the fourth converter controller is programmed to selectively operate the fourth power converter in a DC voltage control mode whereby, in response to a change in the third DC voltage reference the third power converter is required to provide and the resulting change in voltage across the second transmission conduit, the fourth converter controller modifies the DC current reference the fourth power converter is required to provide in order that the fourth power converter achieves a DC voltage reference that accommodates the change in voltage across the second transmission conduit.

9. A method of operating a multi-terminal power transmission network comprising: at least first and second DC terminals interconnected by a first transmission conduit to permit the transfer of power between the first and second DC terminals; the first DC terminal additionally being connected via a first interconnector switch with an interconnection conduit extending in-use to a further DC terminal and separately connected with a first power converter, the first power converter interconnecting the first DC terminal with a first AC network element and including a first converter controller programmed to control the transfer of power between the first AC network element and the first transmission and interconnection conduits (by establishing at least a first DC voltage reference that the first power converter is required to provide, and the second DC terminal additionally being interconnected with a second AC network element by a second power converter including a second converter controller programmed to control the transfer of power between the first transmission conduit and the second AC network element, the first power converter further including a first supplementary controller and the method of the invention comprising the step of having the first supplementary controller selectively modify, as a function of a DC current flowing in the interconnection conduit, the first DC voltage reference that the first power converter is required to provide so as to drive the DC current flowing in the interconnection conduit below a predetermined threshold and thereby facilitate disconnection of the interconnection conduit from the first DC terminal via opening of the first interconnector switch;

further including third and fourth DC terminals interconnected by a second transmission conduit to permit the transfer of power between the third and fourth DC terminals; the third DC terminal additionally being connected via a second interconnector switch with the interconnection conduit, and separately connected with a third power converter, the third power converter interconnecting the third DC terminal with a third AC network element and including a third converter controller programmed to control the transfer of power between the third AC network element and the second transmission and interconnection conduits by establishing at least a third DC voltage reference that the third power converter is required to provide; and the fourth DC terminal additionally being interconnected with a fourth AC network element by a fourth power converter including a fourth converter controller programmed to control the transfer of power between the second transmission conduit and the fourth AC network element, the third power converter further including a second supplementary controller programmed to selectively modify the third DC voltage reference that the third power converter is required to provide in cooperation with any changes in the DC current flowing in the interconnection conduit initiated by the first supplementary controller and thereby facilitate disconnection of the interconnection conduit from the third DC terminal via opening of the second interconnector switch.

* * * * *